United States Patent
Zhou et al.

(10) Patent No.: US 9,034,206 B2
(45) Date of Patent: May 19, 2015

(54) HALOGEN SILICATE LUMINESCENT MATERIAL AND THE PREPARATION METHOD AND APPLICATION THEREOF

(75) Inventors: Mingjie Zhou, Guangdong (CN); Jun Liu, Guangdong (CN); Wenbo Ma, Guangdong (CN)

(73) Assignee: Ocean's King Lighting Science & Technology Co., Ltd., Guangdong (CN)

( * ) Notice: Subject to any disclaimer, the term of this patent is extended or adjusted under 35 U.S.C. 154(b) by 188 days.

(21) Appl. No.: 13/702,350

(22) PCT Filed: Jun. 18, 2010

(86) PCT No.: PCT/CN2010/074067
§ 371 (c)(1),
(2), (4) Date: Dec. 6, 2012

(87) PCT Pub. No.: WO2011/156971
PCT Pub. Date: Dec. 22, 2011

(65) Prior Publication Data
US 2013/0075657 A1    Mar. 28, 2013

(51) Int. Cl.
*C09K 11/61* (2006.01)
*C09K 11/77* (2006.01)
*C09K 11/87* (2006.01)
*B82Y 40/00* (2011.01)

(52) U.S. Cl.
CPC ............ *C09K 11/873* (2013.01); *C09K 11/7734* (2013.01); *B82Y 40/00* (2013.01); *Y10S 977/773* (2013.01); *Y10S 977/896* (2013.01)

(58) Field of Classification Search
CPC ............... C09K 11/77; C09K 11/7728; C09K 11/7732–11/7734; C09K 11/873; Y10S 977/90; Y10S 977/773; Y10S 977/775; H01L 33/502; B82Y 40/00

USPC ...... 252/301.4 F, 301.4 H, 301.4 R; 313/486, 313/503; 977/773–775, 990
See application file for complete search history.

(56) References Cited

U.S. PATENT DOCUMENTS

2009/0289271 A1*  11/2009  Tian et al. ..................... 257/98
2013/0075658 A1*  3/2013   Zhou et al. ............. 252/301.4 F

FOREIGN PATENT DOCUMENTS

KR    100289531 B1    2/2001
KR    100289531 B1 *  2/2001

OTHER PUBLICATIONS

KR100289531 machine translation received Aug. 4, 2014.*
S. Tamil Selvan, T. Hayakawa, and M. Nogami, Remarkable Influence of Silver Islands on the Enhancement of fluorescence from Eu3+ Ion-Doped Silica Gels, J. Phys. Chem B. 1999, 103, 7064-7067.
F. Zhang, G. B. Braun, Y. Shi, Y. Zhang, X. Sun, N.O. Reich, D. Zhao, and G. Stucky, Fabrication of Ag@SiO2@Y2O3: Er Nanostructures for Bioimaging: Tuning of the Upconversion Fluorescence with Silver Nanoparticles, J. Am. chem. Soc. 2010, 132, 2850-2851.
First Office Action of Corresponding Chinese Patent Application dated Oct. 10, 2013.

\* cited by examiner

*Primary Examiner* — Carol M Koslow
*Assistant Examiner* — Lynne Edmondson
(74) *Attorney, Agent, or Firm* — Rosenberg, Klein & Lee

(57) ABSTRACT

Disclosed is a halogen silicate luminescent material having a chemical structural formula of $(N_{1-a-b}Eu_aMn_b)_{10}Si_6O_{21}Cl_2$ with xM nanoparticles, and the preparation method thereof, where M is at least one of Ag, Au, Pt and Pd, N is an alkaline earth metal and specifically at least one of Mg, Ca, Sr and Ba, $0<x\le 1\times 10^{-2}$, $0 M<a\le 0.3$, and $0<b<0.3$. The above halogen silicate luminescent material having the core-shell structure utilizes the surface plasmon resonance generated by the surface of metal nanoparticles.

12 Claims, 1 Drawing Sheet

… (1) …

HALOGEN SILICATE LUMINESCENT MATERIAL AND THE PREPARATION METHOD AND APPLICATION THEREOF

FIELD OF THE INVENTION

The present invention relates to the field of luminescent material and illumination technology, and particularly to a halogen silicate luminescent material and the preparation method and application thereof.

BACKGROUND OF THE INVENTION

Compared with such conventional illumination sources as a incandescent lamp and a fluorescent lamp, LED draws more attention because of its advantages such as electricity and energy saving, environmental protection (no pollution of metal mercury, etc.), long lifetime (up to over one hundred thousand hours), high shock and impact resistance, and fast reaction speed. Besides, LED is also valued by research institutes and enterprises at home and abroad for its advantages such as small volume, and has been applied to such fields as a backlight of the liquid crystal display, an indicator light, a street lamp and common illumination. The conventional LED white light is mainly composed of the yellow luminescent material and LED blue light. Because color of the emitted light of the device changes with driving voltage and thickness of the luminescent material coating, and the main maximum of the yellow luminescent material may move with the temperature of LED, the device has poor color reductibility and low color rendering index. In addition, the absorption peak of the luminescent material based on the blue LED light conversion is required to be within the range of 420-470 nm, which few luminescent materials can satisfy. The researchers found that the white LED fluorescent powder excited by the near ultraviolet (380-410 nm) InGaN die or the 460 nm blue light can overcome the above shortcomings. However, most of the fluorescent powders used in the traditional white LED are silicate and aluminosilicate material, such as $Ba_3MgSi_2O_8$: Eu, Mn, $Sr_2MgSiO_5$:Eu, $Sr_2MgSiO_5$:Eu, Mn, $Sr_3MgSi_2O_8$: Eu, Mn and YAG:Ce, which have low luminous efficiency, poor stability, difficulty in synthesis, and high requirement of equipment.

SUMMARY OF THE INVENTION

Based on this, it is necessary to provide a halogen silicate luminescent material having good stability and high luminous efficiency.

A halogen silicate luminescent material is provided, having a chemical structural formula of $(N_{1-a-b}Eu_aMn_b)_{10}Si_6O_{21}Cl_2$ with xM nanoparticles, wherein M is at least one of Ag, Au, Pt and Pd, N is an alkaline earth metal and specifically at least one of Mg, Ca, Sr and Ba, $0<x\leq1\times10^{-2}$, $0<a\leq0.3$, and $0\leq b\leq0.3$.

Preferably, the $M@(N_{1-a-b}Eu_aMn_b)_{10}Si_6O_{21}Cl_2$ has a core-shell structure, wherein M is an inner core and $(N_{1-a-b}Eu_aMn_b)_{10}Si_6O_{21}Cl_2$ is an outer shell, the luminous intensity of the alkaline earth halogen silicate $(N_{1-a-b}Eu_aMn_b)_{10}Si_6O_{21}Cl_2$ of the shell being enhanced by M in the form of metal nanometer core through the produced surface plasmon resonance effect.

The halogen silicate luminescent material having the above chemical structure can be used as the luminescent material for the ultraviolet-conversion-type white LED.

Moreover, for the defects of the traditional luminescent material such as difficulty in synthesis and high requirement of equipment, it is further necessary to provide a method of preparation of the halogen silicate luminescent material that is simple in operation and has low requirement of equipment.

A method of preparation of the halogen silicate luminescent material is provided, comprising: first preparing the M nanoparticle sol, then preparing the $M@SiO_2$ microsphere powder by coating M with $SiO_2$ according to the stöber method, and finally preparing the halogen silicate luminescent material having the chemical structural formula of $M@(N_{1-a-b}Eu_aMn_b)_{10}Si_6O_{21}Cl_2$ with the $M@SiO_2$ microsphere powder as the raw material and the addition of other metal compounds, where M is at least one of Ag, Au, Pt and Pd, N is an alkaline earth metal and specifically at least one of Mg, Ca, Sr and Ba, $0<x\leq1\times10^{-2}$, $0<a\leq0.3$, and $0\leq b\leq0.3$.

Preferably, the preparation of the M nanoparticle sol includes the following specific steps: A1) preparing a metal M compound solution, and dissolving one or more assistants into the metal M compound solution under a magnetic stirring condition, making the assistant(s) have a concentration of $1.5\times10^{-4}$-$2.1\times10^{-3}$ g/mL in the final M nanoparticle sol; A2) preparing a reductant solution, adding the reductant solution into the solution containing the assistant(s) obtained in the above A1) under the magnetic stirring condition in an amount ratio of the reductant to the metal ion from 1.2:1 to 4.8:1, and reacting for 10-45 min to obtain the M nanoparticle sol.

Preferably, the metal compound in the metal compound solution is at least one of $AgNO_3$, $AuCl_3 \cdot HCl \cdot 4H_2O$, $H_2PtCl_6 \cdot 6H_2O$ and $PdCl_2 \cdot 2H_2O$, and the solvent is water or ethanol; the assistant is at least one of polyvinylpyrrolidone, sodium citrate, cetyl trimethylammonium bromide, sodium lauryl sulfate and sodium dodecanesulphonate; in the reductant solution, the reductant is at least one of hydrazine hydrate, ascorbic acid and sodium borohydride, and the solvent is water or ethanol.

Preferably, the method further includes steps of surface treatment on the obtained M nanoparticle sol, which are specifically as follows: weighing a certain amount of surface treatment agent according to the volume of the M nanoparticle sol, adding into the M nanoparticle sol, and stirring at room temperature for 3-24 h to make the surface treatment agent have a concentration of 0.001 g/mL~0.1 g/mL in the final sol; and the surface treatment agent is polyvinylpyrrolidone.

Preferably, the preparation of the $M@SiO_2$ microsphere powder according to the stöber method includes the following specific steps: adding 4.33 mol/L ethyl orthosilicate into the mixed solution $((V_{1+}V_2):V_3:V_4=10:25:6)$ composed of deionized water (having a volume of $V_1$), the M nanoparticle sol (having a volume of $V_2$) having been subject to the surface treatment, ethanol (having a volume of $V_3$) and ammonia water (having a volume of $V_4$) to allow a condensation-polycondensation reaction to occur, stirring for 3-12 h to obtain a milky white $M@SiO_2$ colloid suspension, which is then thermostatically dried at 80° C.-150° C. and ground to produce the $M@SiO_2$ microsphere powder (a), which is alternatively further presintered at 300° C.-500° C. for 2-5 h to produce the $M@SiO_2$ microsphere powder (b); the amount of ethyl orthosilicate is determined according to the silicon content in the final halogen silicate luminescent material.

Preferably, the preparation of the halogen silicate luminescent material having the chemical structural formula of $M@(N_{1-a-b}Eu_aMn_b)_{10}Si_6O_{21}Cl_2$ with the $M@SiO_2$ microsphere powder as the raw material by a sol-gel method includes the following specific steps: adding the solution composed of alkaline earth metal chloride, manganese acetate and europium nitrate into a beaker according to contents of alkaline earth metal, Eu and Mn in the final halogen silicate luminescent material, and stirring to produce a mixed solution A; adding a complexing agent and a gelling agent into the solution A, heating at 70° C.-90° C. in a water bath, and stirring sufficiently to produce a sol B; scattering the M@SiO$_2$ microsphere powder (a) ultrasonically into the ethanol solution to obtain a solution C; adding the solution C into the sol B, reacting at 70° C.-90° C. in a water bath to produce a gel, which is dried to produce a precursor of the halogen silicate luminescent material; presintering the precursor at 500° C.-800° C. for 2-7 h, cooling, grinding, calcining the ground product in a reducing atmosphere at 800° C.-1300° C. for 2-6 h, and grinding to produce the M@(N$_{1-a-b}$Eu$_a$Mn$_b$)$_{10}$Si$_6$O$_{21}$Cl$_2$ luminescent material; the complexing agent is citric acid, the molar ratio of which to the total metal ions in the mixed solution is from 1:1 to 3:1, and the gelling agent is polyethylene glycol.

Preferably, the preparation of the halogen silicate luminescent material having the chemical structural formula of M@(N$_{1-a-b}$Eu$_a$Mn$_b$)$_{10}$Si$_6$O$_{21}$Cl$_2$ with the M@SiO$_2$ microsphere powder as the raw material by a high-temperature solid-phase method includes the following specific steps: weighing the M@SiO$_2$ microsphere powder (b), NCO$_3$, NCl$_2$.6H$_2$O in excess of 10%-40%, Eu$_2$O$_3$ and MnCO$_3$ or Mn(OAc)$_2$ according to the contents of alkaline earth metal, Eu and Mn in the final halogen silicate luminescent material, grinding uniformly in an agate mortar, putting into a corundum crucible, first presintering at 500° C.-800° C. for 2-7 h, cooling, grinding, then sintering in the reducing atmosphere at 800° C.-1300° C. for 2-6 h, and grinding to produce the M@(N$_{1-a-b}$Eu$_a$Mn$_b$)$_{10}$Si$_6$O$_{21}$Cl$_2$ luminescent material; and the reducing atmosphere is one of a mixed gas composed of nitrogen and hydrogen in a volume ratio of 95:5 or 90:10, pure hydrogen, and carbon monoxide.

The alkaline earth and rare earth metal ions doped in the above halogen silicate luminescent material have excellent stability, high luminous efficiency, a color rendering index more than 85%, and good luminescent property, and can be applied to LED.

Besides, with the core-shell structure of the halogen silicate luminescent material, the internal quantum efficiency of the luminescent material can be improved by making use of the surface plasmon resonance generated by the surface of metal nanoparticles, thus further enhancing the luminous intensity.

The halogen silicate luminescent material produced by the above preparation method has good stability and high luminous intensity, and the preparation method has the advantages of simple operation, no pollution, easy control, low requirements for equipment, and being favorable to industrialized production, and can be widely applied to the field of preparation of the luminescent materials.

DETAILED DESCRIPTION OF THE EMBODIMENTS

Figure 1:
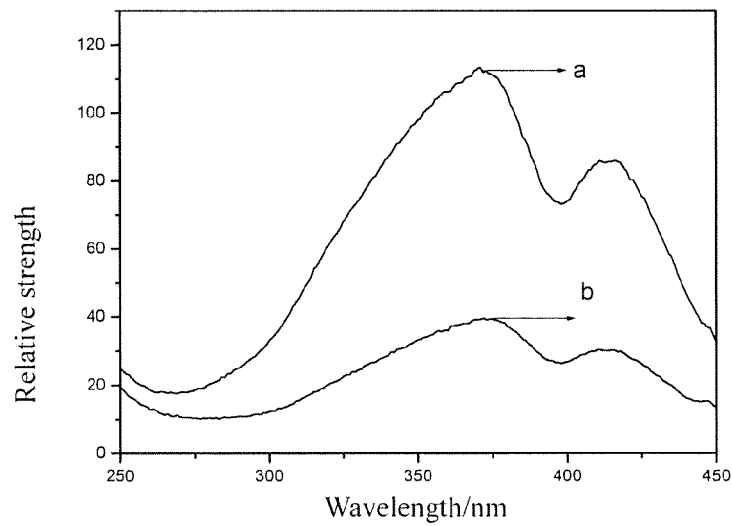
FIG. 1 is a comparison diagram of the excitation spectra of the luminescent materials prepared in Example 7 (having a monitoring wavelength of 505 nm), where the curve a is the excitation spectrum of the luminescent material (Ca$_{0.95}$Eu$_{0.05}$)$_{10}$Si$_6$O$_{21}$Cl$_2$:1×10$^{-3}$Ag, and the curve b is the excitation spectrum of the luminescent material (Ca$_{0.95}$Eu$_{0.05}$)$_{10}$Si$_6$O$_{21}$Cl$_7$.

Through the addition of metal nanoparticles into the luminescent material, the luminous intensity of the luminescent material was improved by making use of the surface plasmon (SP) resonance effect generated by the surface of metal nanoparticles. The surface plasmon produced by the surface of metal nanoparticles is a wave propagating along an interface between a metal and a medium, whose amplitude is damped exponentially with the distance away from the interface. When the luminescent material is doped with metal particles, the property, dispersion relation, excitation mode, coupling effect and the like of the surface plasmon polaritons (SPPs) will be changed significantly. The electromagnetic field caused by SPPs can not only limit propagation of a light wave in a sub-wavelength sized structure, but also produce and control electromagnetic radiation from the optical frequencies to the microwave region, realizing active control of the light propagation, thus increasing optical state density and spontaneous radiation velocity of the luminescent material. Moreover, the internal quantum efficiency of the luminescent material can be improved greatly by making use of the coupling effect of the surface plasmon, thus improving the luminous intensity of the luminescent material.

Since the alkaline earth halogen silicate is a host material having low synthesis temperature, good luminescent property and good physical and chemical stability, and easy to achieve efficient ultraviolet-near ultraviolet excitation, a halogen silicate luminescent material doped with rare earth ions will be provided below for the ultraviolet-conversion-type white LED in combination with the surface plasmon resonance effect of the metal nanoparticles, having a chemical structural formula of M@(N$_{1-a-b}$Eu$_a$Mn$_b$)$_{10}$Si$_6$O$_{21}$Cl$_2$, including the luminescent material (N$_{1-a-b}$Eu$_a$Mn$_b$)$_{10}$Si$_6$O$_{21}$Cl$_2$ as the shell and the metal nanoparticle M added as the core into the luminescent material, where M is at least one of Ag, Au, Pt and Pd, N is at least one of such alkaline earth metals as Mg, Ca, Sr and Ba, x is the molar ratio of the metal nanoparticle M to the luminescent material (N$_{1-a-b}$Eu$_a$Mn$_b$)$_{10}$Si$_6$O$_{21}$Cl$_2$, and the range of x is 0<x≤1×10$^{-2}$; the range of a is 0<a≤0.3; the range of b is 0≤b≤0.3.

In the above preparation process of the halogen silicate luminescent material, first preparing M nanoparticle sol, then preparing the M@SiO$_2$ microsphere powder with the core-shell structure through the TEOS condensation-polycondensation according to the stöber method, and finally preparing the halogen silicate luminescent material with the M@SiO$_2$ microsphere powder as the raw material and the addition of other metal compounds. Each of the steps is specifically as follows:

I. Preparation of the M Nanoparticle Sol:

1) Weighing a suitable metal compound and dissolving it in a solvent, which is then prepared and diluted into a metal compound solution of a certain concentration; the metal compound is preferably at least one of silver nitrate, chloroauric acid, chloroplatinic acid and palladium chloride, and the solvent is preferably water or ethanol.

2) Dissolving one or more assistants into the above metal compound solution obtained in 1) under the magnetic stirring condition, and enabling the assistant(s) to have a concentration of 1.5×10$^{-4}$-2.1×10$^{-3}$ g/mL in the final M nanoparticle sol; the assistant is preferably polyvinylpyrrolidone (PVP), sodium citrate, cetyl trimethylammonium bromide, sodium lauryl sulfate or sodium dodecanesulphonate.

3) Weighing the corresponding amount of reductant to dissolve into the solvent to prepare a reductant solution at a concentration range of $1\times10^{-3}$-$1\times10^{-2}$ mol/L; the reductant is preferably hydrazine hydrate, ascorbic acid or sodium borohydride, and the solvent is preferably water or ethanol.

4) Adding the above reductant solution obtained in 3) into the above solution obtained in 2) under the magnetic stirring condition in an amount ratio of the reductant to the metal ion from 1.2:1 to 4.8:1, and obtaining the M nanoparticle sol after reaction of the entire system for 10-45 min.

Preferably, weighing a certain amount of surface treatment agent to add into the M nanoparticle sol according to the volume of the obtained M nanoparticle sol, and stirring at room temperature for 3-24 h, with the surface treatment agent added at an amount of 0.001-0.1 g/mL; further preferably the surface treatment agent is polyvinylpyrrolidone (PVP).

II. Preparation of the M@$SiO_2$ Microsphere Powder:

Adding into a beaker successively a certain volume of deionized water (having a volume of $V_1$), the M nanoparticle sol (having a volume of $V_2$) having been subject to the surface treatment, ethanol (having a volume of $V_3$) and ammonia water (having a volume of $V_4$) according to the stöber method (W. Stöber, A. Fink, E. Bohn, J. Colloid Interface Sci. 26 (1968) 62-69), where $(V_1+V_2):V_3:V_4=10:25:6$; stirring with a magnetic stirrer to make the above solution uniform, then adding a proper amount of ethyl orthosilicate (4.33 mol/L) to allow a condensation-polycondensation reaction to occur, stirring for another 3-12 h to obtain a milky white M@$SiO_2$ colloid suspension, which is then thermostatically dried at 80° C.-150° C. and ground to produce the M@$SiO_2$ microsphere powder (a), which is alternatively further presintered at 300° C.-500° C. for 2-5 h to produce the M@$SiO_2$ microsphere powder (b), where the volume V of the added ethyl orthosilicate is equal to the volume of the ethyl orthosilicate calculated according to the amount of the silicon source needed in the final product.

III. Preparation of M@$(N_{1-a-b}Eu_aMn_b)_{10}Si_6O_{21}Cl_2$:

Preparing M@$(N_{1-a-b}Eu_aMn_b)_{10}Si_6O_{21}Cl_2$ by the sol-gel method or the high-temperature solid-phase method.

(I) Sol-gel Method:

Adding into a beaker a certain concentration of the solution composed of alkaline earth metal chloride, manganese acetate (Mn(OAc)$_2$) and europium nitrate, and stirring to produce a mixed solution A; adding a complexing agent and a gelling agent into the solution A, heating at 70° C.-90° C. in a water bath, and stirring sufficiently to produce a sol B, where the complexing agent is citric acid, a molar ratio of which to the total metal ions in the mixed solution is from 1:1 to 3:1, and the needed gelling agent is polyethylene glycol (PEG); scattering the M@$SiO_2$ microsphere powder (a) ultrasonically into the ethanol solution to obtain a solution C; adding the solution C into the sol B, reacting at 70° C.-90° C. in a water bath to produce a gel, which is dried to produce a precursor of the halogen silicate luminescent material with the core-shell structure; presintering the precursor at 500° C.-800° C. for 2-7 h, cooling, grinding, calcining the ground product in a reducing atmosphere at 800° C.-1300° C. for 2-6 h, and grinding again to produce the M@$(N_{1-a-b}Eu_aMn_b)_{10}Si_6O_{21}Cl_2$ halogen silicate luminescent material.

(II) High-temperature Solid-phase Method:

Grinding the M@$SiO_2$ microsphere powder (b), $NCO_3$, $NCl_2.6H_2O$ in excess of 10%-40% (N=Ca, Sr and Ba), $Eu_2O_3$ and $MnCO_3$ or Mn(OAc)$_2$ uniformly in an agate mortar before putting into a corundum crucible, first presintering at 500° C.-800° C. for 2-7 h, cooling, grinding, then sintering in the reducing atmosphere at 800° C.-1300° C. for 2-6 h, and grinding to produce the M@$(N_{1-a-b}Eu_aMn_b)_{10}Si_6O_{21}Cl_2$ halogen silicate luminescent material.

In the above preparation method, the needed reducing atmosphere is a mixed gas composed of nitrogen and hydrogen in a volume ratio of 95:5 or 90:10, pure hydrogen, and carbon monoxide.

The above halogen silicate luminescent material and the preparation method, luminescent property and the like thereof will further be described below with reference to specific examples.

Example 1

Preparation of $(Sr_{0.7}Eu_{0.3})_{10}Si_6O_{21}Cl_2:1\times10^{-3}Pt$ by the Sol-gel Method Preparation of the Pt nanoparticle sol: Weighing 5.18 mg chloroplatinic acid ($H_2PtCl_6.6H_2O$) to dissolve into 17 mL deionized water; after chloroplatinic acid is completely dissolved, weighing 8.0 mg sodium citrate and 12.0 mg sodium dodecanesulphonate, and dissolving into the chloroplatinic acid aqueous solution under the magnetic stirring condition; weighing 0.38 mg sodium borohydride to dissolve into 10 mL deionized water to obtain 10 mL sodium borohydride aqueous solution at a concentration of $1\times10^{-3}$ mol/L, and meanwhile preparing 10 mL hydrazine hydrate solution at a concentration of $1\times10^{-2}$ mol/L; under the magnetic stirring condition, first dropwise adding 0.4 mL sodium borohydride aqueous solution into the chloroplatinic acid aqueous solution and stirring to react for 5 min, then dropwise adding 2.6 mL $1\times10^{-2}$ mol/L hydrazine hydrate solution into the chloroplatinic acid aqueous solution, and then continuing to react for 40 min to obtain 20 mL Pt nanoparticle sol with the Pt concentration at $5\times10^{-4}$ mol/L; adding 0.2 g PVP into the Pt nanoparticle sol, and magnetically stirring for 3 h to produce the Pt nanoparticle sol having been subject to the surface treatment.

Preparation of the Pt@$SiO_2$ microsphere powder: Putting into a beaker successively 5.6 mL deionized water, 4.4 mL Pt nanoparticle sol having been subject to the surface treatment and 25 mL ethanol, stirring, then adding 6 mL ammonia water, adding 3 mL ethyl orthosilicate, and stirring for 4 h to produce a suspension of metal ions coated with silicon dioxide as the inner shell; then thermostatically drying at 80° C., and grinding to produce the desired M@$SiO_2$ powder.

Preparation of $(Sr_{0.7}Eu_{0.3})_{10}Si_6O_{21}Cl_2:1\times10^{-3}Pt$: Putting 15.4 mL 1 mol/L $SrCl_2$ solution and 6.6 mL 1 mol/L $Eu(NO_3)_3$ solution into a beaker, and stirring to produce a mixed solution A; then adding 4.6231 g citric acid monohydrate into the mixed solution A in a molar ratio of the added citric acid to the total metal ions in the mixed solution at 1:1, and adding 1 g PEG (polyethylene glycol), heating at 70° C. in a water bath, and stirring sufficiently to produce a sol B; scattering the Pt@$SiO_2$ microsphere powder ultrasonically into 5 mL ethanol solution to obtain a solution C; adding C into the sol B, reacting at 80° C. in a water bath to produce a gel, which is dried to produce the precursor of the core-shell halogen silicate luminescent material; presintering the precursor at 500° C. for 7 h, cooling, grinding, calcining the ground product at 800° C. in a reducing atmosphere (a mixed gas of nitrogen and hydrogen in a volume ratio of 90:10) for 6 h, and grinding to produce the desired $(Sr_{0.7}Eu_{0.3})_{10}Si_6O_{21}Cl_2:1\times10^{-3}Pt$ luminescent material.

Example 2

Preparation of $(Ca_{0.85}Eu_{0.1}Mn_{0.05})_{10}Si_6O_{21}Cl_2$:1×$10^{-2}$Au by the Sol-gel Method Preparation of Au nanoparticle sol: Weighing 4.12 mg chloroauric acid ($AuCl_3 \cdot HCl \cdot 4H_2O$) to dissolve into 8.4 mL deionized water; after chloroauric acid is completely dissolved, weighing 14 mg sodium citrate and 6 mg cetyl trimethylammonium bromide, and dissolving into the chloroauric acid aqueous solution under the magnetic stirring condition; weighing 1.9 mg sodium borohydride and 17.6 mg ascorbic acid to dissolve into 10 mL deionized water, respectively, to obtain 10 mL sodium borohydride aqueous solution at a concentration of $5\times10^{-3}$ mol/L and 10 mL ascorbic acid aqueous solution at a concentration of $1\times10^{-2}$ mol/L; under the magnetic stirring condition, first adding 0.04 mL sodium borohydride aqueous solution into the chloroauric acid aqueous solution, stirring to react for 5 min, then adding 1.56 mL $1\times10^{-2}$ mol/L ascorbic acid aqueous solution into the chloroauric acid aqueous solution, and then continuing to react for 30 min to obtain 10 mL Au nanoparticle sol with the Au concentration at $1\times10^{-3}$ mol/L; then adding 0.01 g PVP into the Au nanoparticle sol, and magnetically stirring for 8 h to produce the Au nanoparticle sol having been subject to the surface treatment.

Preparation of Au@$SiO_2$ microsphere powder: Putting into a beaker successively 4.5 mL deionized water, 5.5 mL Au nanoparticle sol having been subject to the surface treatment and 25 mL ethanol, stirring, then adding 6 mL ammonia water, adding 0.8 mL ethyl orthosilicate, and stirring for 12 h to produce a suspension of metal ions coated with silicon dioxide as the inner shell; then thermostatically drying at 150° C., and grinding to produce the desired M@$SiO_2$ powder.

Preparation of $(Ca_{0.85}Eu_{0.1}Mn_{0.05})_{10}Si_6O_{21}Cl_2$:1×$10^{-2}$Au: Putting 4.68 mL 1 mol/L $CaCl_2$ solution, 2.75 mL 0.1 mol/L $Mn(OAc)_2$ solution, and 5.5 mL 0.1 mol/L $Eu(NO_3)_3$ solution into a beaker to obtain a mixed solution A; then adding 3.4716 g citric acid into the mixed solution A in a molar ratio of the added citric acid to the total metal ions in the mixed solution at 3:1, and adding 1 g PEG (polyethylene glycol), heating at 90° C. in a water bath, and stirring sufficiently to produce a sol B; scattering the Pt@$SiO_2$ microsphere powder ultrasonically into 10 mL ethanol solution to obtain a solution C; adding the solution C into the sol B, reacting at 80° C. in a water bath to produce a gel, which is dried to produce the precursor of the core-shell halogen silicate luminescent material; presintering the precursor at 800° C. for 2 h, cooling, grinding, calcining the ground product in a reducing atmosphere (CO) at 1300° C. for 2 h, and grinding to produce the desired $(Ca_{0.85}Eu_{0.1}Mn_{0.05})_{10}Si_6O_{21}Cl_2$:1×$10^{-2}$Au luminescent material.

Example 3

Preparation of $(Ca_{0.96}Eu_{0.04})_{10}Si_6O_{21}Cl_2$:1×$10^{-4}$Ag by the Sol-gel Method Preparation of the Ag nanoparticle sol: Weighing 3.40 mg silver nitrate ($AgNO_3$) to dissolve into 18.4 mL deionized water; after silver nitrate is completely dissolved, weighing 22 mg sodium citrate and 20 mg PVP, and dissolving into the silver nitrate aqueous solution under the magnetic stirring condition; weighing 5.7 mg sodium borohydride to dissolve into 10 mL deionized water to obtain 10 mL sodium borohydride aqueous solution at a concentration of $1.5\times10^{-2}$ mol/L; adding 1.6 mL $1.5\times10^{-2}$ mol/L sodium borohydride aqueous solution into the silver nitrate aqueous solution at one time under the magnetic stirring condition, and then continuing to react for 10 min to obtain 20 mL Ag nanoparticle sol with the Ag concentration at $1\times10^{-3}$ mol/L; then adding 0.1 g PVP into the Ag nanoparticle sol, and magnetically stirring for 24 h to produce the Ag nanoparticle sol having been subject to the surface treatment.

Preparation of the Ag@$SiO_2$ microsphere powder: Putting into a beaker successively 9.9 mL deionized water, 0.1 mL Ag nanoparticle sol having been subject to the surface treatment and 25 mL ethanol, stirring, then adding 6 mL ammonia water, adding 1.4 mL ethyl orthosilicate, and stirring for 8 h to produce a suspension of metal ions coated with silicon dioxide as the inner shell; then thermostatically drying at 100° C., and grinding to produce the desired Ag@$SiO_2$ powder.

Preparation of $(Ca_{0.96}Eu_{0.04})_{10}Si_6O_{21}Cl_2$:1×$10^{-4}$Ag: Putting 9.6 mL 1 mol/L $CaCl_2$ solution and 4 mL 0.1 mol/L $Eu(NO_3)_3$ solution into a beaker to obtain a mixed solution A; then adding 4.2028 g citric acid into the mixed solution A in a molar ratio of the added citric acid to the total metal ions in the mixed solution at 2:1, and adding 1 g PEG (polyethylene glycol), heating at 90° C. in a water bath, and stirring sufficiently to produce a sol B; scattering the Ag@$SiO_2$ microsphere powder ultrasonically into 10 mL ethanol solution to obtain a solution C; adding the solution C into the sol B, reacting at 80° C. in a water bath to produce a gel, which is dried to produce the precursor of the core-shell halogen silicate luminescent material; presintering the precursor at 600° C. for 5 h, cooling, grinding, calcining the ground product at 1000° C. in a reducing atmosphere (a mixed gas of nitrogen and hydrogen in a volume ratio of 95:5) for 3 h, and grinding to produce the desired $(Ca_{0.96}Eu_{0.04})_{10}Si_6O_{21}Cl_2$:1×$10^{-4}$Ag luminescent material.

Example 4

Preparation of $(Sr_{0.46}Mg_{0.47}Eu_{0.04}Mn_{0.03})_{10}Si_6O_{21}Cl_2$:1×$10^{-5}$Ag by the Sol-gel Method Preparation Of the Ag nanoparticle sol: Weighing 3.40 mg silver nitrate ($AgNO_3$) to dissolve into 18.4 mL deionized water; after silver nitrate is completely dissolved, weighing 22 mg sodium citrate and 20 mg PVP, and dissolving into the silver nitrate aqueous solution under the magnetic stirring condition; weighing 5.7 mg sodium borohydride to dissolve into 10 mL deionized water to obtain 10 mL sodium borohydride aqueous solution at a concentration of $1.5\times10^{-2}$ mol/L; adding 1.6 mL $1.5\times10^{-2}$ mol/L sodium borohydride aqueous solution into the silver nitrate aqueous solution at one time under the magnetic stirring condition, and then continuing to react for 10 min to obtain 20 mL Ag nanoparticle sol with the Ag concentration at $1\times10^{-3}$ mol/L; then adding 0.1 g PVP into the Ag nanoparticle sol, and magnetically stirring for 24 h to produce the Ag nanoparticle sol having been subject to the surface treatment.

Preparation of Ag@$SiO_2$ microsphere powder: Putting into a beaker successively 9.99 mL deionized water, 0.01 mL Ag nanoparticle sol having been subject to the surface treatment and 25 mL ethanol, stirring, then adding 6 mL ammonia water, adding 1.4 mL ethyl orthosilicate, and stirring for 8 h to produce a suspension of metal ions coated with silicon dioxide as the inner shell; then thermostatically drying at 100° C., and grinding to produce the desired Ag@$SiO_2$ powder.

Preparation of $(Sr_{0.46}Mg_{0.47}Eu_{0.04}Mn_{0.03})_{10}Si_6O_{21}Cl_2$:1×$10^{-5}$Ag: Putting 4.6 mL 1 mol/L $SrCl_2$ solution, 0.3 mL 0.001 mol/L $Mn(OAc)_2$ solution, and 0.4 mL 0.001 mol/L Eu(NO$_3$)$_3$ solution into a beaker to obtain a mixed solution A; then adding 4.2028 g citric acid into the mixed solution A in a molar ratio of the added citric acid to the total metal ions in the mixed solution at 2:1, and adding 1.5 g PEG (polyethylene glycol), heating at 90° C. in a water bath, and stirring sufficiently to produce a sol B; scattering the Ag@SiO$_2$ microsphere powder ultrasonically into 10 mL ethanol solution to obtain a solution C; adding the solution C into the sol B, reacting at 80° C. in a water bath to produce a gel, which is dried to produce the precursor of the core-shell halogen silicate luminescent material; presintering the precursor at 500° C. for 5 h, cooling, grinding, calcining the ground product at 900° C. in a reducing atmosphere (a mixed gas of nitrogen and hydrogen in a volume ratio of 95:5) for 4 h, and grinding to produce the desired (Sr$_{0.46}$Mg$_{0.47}$Eu$_{0.04}$Mn$_{0.03}$)$_{10}$Si$_6$O$_2$Cl$_2$: 1×10$^{-5}$Ag luminescent material.

Example 5

Preparation of (Sr$_{0.65}$Eu$_{0.05}$Mn$_{0.3}$)$_{10}$Si$_6$O$_{21}$Cl$_2$:1× 10$^{-4}$ Pd by the High-temperature Solid-phase Method Preparation Of the Pd nanoparticle sol: Weighing 0.43 mg palladium chloride (PdCl$_2$.2H$_2$O) to dissolve into 8.5 mL deionized water; after palladium chloride is completely dissolved, weighing 11.0 mg sodium citrate and 4.0 mg sodium lauryl sulfate, and dissolving into the palladium chloride aqueous solution under the magnetic stirring condition; weighing 3.8 mg sodium borohydride to dissolve into 10 mL deionized water to obtain a sodium borohydride reducing solution at a concentration of 1×10$^{-2}$ mol/L; adding 0.48 mL 1×10$^{-2}$ mol/L sodium borohydride aqueous solution rapidly into the palladium chloride aqueous solution under the magnetic stirring condition, and then continuing to react for 20 min to obtain 10 mL Pd nanoparticle sol with the Pd concentration at 1×10$^{-4}$ mol/L; then adding 0.05 g PVP into this 10 mL Pd nanoparticle sol, and magnetically stirring for 12 h to produce the Pd nanoparticle sol having been subject to the surface treatment.

Preparation of Pd@SiO$_2$ microsphere powder: Putting into a beaker successively 9 mL deionized water, 1 mL Pd nanoparticle sol having been subject to the surface treatment and 25 mL ethanol, stirring, then adding 6 mL ammonia water, adding 1.4 mL ethyl orthosilicate, and stirring for 8 h to produce a suspension of metal ions coated with silicon dioxide as the inner shell; then thermostatically drying and grinding at 80° C., and presintering at 500° C. for 2 h to produce the desired Pd@SiO$_2$ powder.

Preparation of (Sr$_{0.65}$Eu$_{0.05}$Mn$_{0.03}$)$_{10}$Si$_6$O$_{21}$Cl$_2$:1×10$^4$Pd: Weighing 0.8120 g SrCO$_3$, 0.2932 g SrCl$_2$.6H$_2$O (in excess of 10%), 0.3449 g MnCO$_3$, 0.0880 g Eu$_2$O$_3$ (99.99%) and the above produced Pt@SiO$_2$ microsphere powder, grinding uniformly in an agate mortar before putting into a corundum crucible, presintering at 500° C. for 7 h, and then sintering in the reducing atmosphere of 5:95 (H$_2$N$_2$) at 800° C. for 6 h to produce the (Sr$_{0.65}$Eu$_{0.05}$Mn$_{0.3}$)$_{10}$Si$_6$O$_{21}$Cl$_2$:1×10$^4$Pd luminescent material.

Example 6

Preparation of (Ca$_{0.98}$Eu$_{0.02}$)$_{10}$Si$_6$O$_{21}$Cl$_2$:1×10$^{-3}$Ag by the High-temperature Solid-phase Method Preparation Of the Ag nanoparticle sol: Weighing 3.40 mg silver nitrate (AgNO$_3$) to dissolve into 18.4 mL deionized water; after silver nitrate is completely dissolved, weighing 22 mg sodium citrate and 20 mg PVP, and dissolving into the silver nitrate aqueous solution under the magnetic stirring condition; weighing 5.7 mg sodium borohydride to dissolve into 10 mL deionized water to obtain 10 mL sodium borohydride aqueous solution at a concentration of 1.5×10$^{-2}$ mol/L; adding 1.6 mL 1.5×10$^{-2}$ mol/L sodium borohydride aqueous solution into the silver nitrate aqueous solution at one time under the magnetic stirring condition, and then continuing to react for 10 min to obtain 20 mL Ag nanoparticle sol with the Ag concentration at 1×10$^{-3}$ mol/L; then adding 0.1 g PVP into the Ag nanoparticle sol, and magnetically stirring for 24 h to produce the Ag nanoparticle sol having been subject to the surface treatment.

Preparation Of Ag@SiO$_2$ microsphere powder: Putting into a beaker successively 10 mL Ag nanoparticle sol having been subject to the surface treatment and 25 mL ethanol, stirring, then adding 6 mL ammonia water, adding 1 mL ethyl orthosilicate, and stirring for 8 h to produce a suspension of metal ions coated with silicon dioxide as the inner shell; then thermostatically drying at 100° C., and grinding to produce the desired Ag@SiO$_2$ powder.

Preparation of (Ca$_{0.98}$Eu$_{0.02}$)$_{10}$Si$_6$O$_{21}$Cl$_2$:1×10$^{-3}$Ag: Weighing 0.8808 g CaCO$_3$, 0.3066 g CaCl$_2$.6H$_2$O (in excess of 40%), 0.0352 g Eu$_2$O$_3$(99.99%) and the above produced Pt@SiO$_2$ microsphere powder, grinding uniformly in an agate mortar before putting into a corundum crucible, presintering at 800° C. for 2 h, then sintering in the reducing atmosphere of 10:90 (147/N$_2$) at 1300° C. for 3 h to produce the (Ca$_{0.98}$Eu$_{0.07}$)$_{10}$Si$_6$O$_{21}$Cl$_2$:1×10$^{-3}$Ag luminescent material.

Example 7

Preparation of 0.001 mol (Ca$_{0.96}$Eu$_{0.04}$)$_{10}$Si$_6$O$_{21}$Cl$_2$: 1×10$^{-3}$Ag by the High-temperature Solid-phase Method Preparation Of the Ag nanoparticle sol: Weighing 3.40 mg silver nitrate (AgNO$_3$) to dissolve into 18.4 mL deionized water; after silver nitrate is completely dissolved, weighing 22 mg sodium citrate and 20 mg PVP, and dissolving into the silver nitrate aqueous solution under the magnetic stirring condition; weighing 5.7 mg sodium borohydride to dissolve into 10 mL deionized water to obtain 10 mL sodium borohydride aqueous solution at a concentration of 1.5×10$^{-2}$ mol/L; adding 1.6 mL 1.5×10$^{-2}$ mol/L sodium borohydride aqueous solution into the silver nitrate aqueous solution at one time under the magnetic stirring condition, and then continuing to react for 10 min to obtain 20 mL Ag nanoparticle sol with the Ag concentration at 1×10$^{-3}$ mol/L; then adding 0.1 g PVP into the Ag nanoparticle sol, and magnetically stirring for 24 h to produce the Ag nanoparticle sol having been subject to the surface treatment.

Preparation of Ag@SiO$_2$ microsphere powder: Putting into a beaker successively 9 mL deionized water, 1 mL Ag nanoparticle sol having been subject to the surface treatment and 25 mL ethanol, stirring, then adding 6 mL ammonia water, adding 1.4 mL ethyl orthosilicate, and stirring for 8 h to produce a suspension of metal ions coated with silicon dioxide as the inner shell; then thermostatically drying and grinding at 150° C., and presintering at 500° C. for 4 h to produce the desired Ag @SiO$_2$ powder.

Preparation of the (Ca$_{0.95}$Eu$_{0.05}$)$_{10}$Si$_6$O$_{21}$Cl$_2$:1×10$^{-3}$Ag luminescent material: Weighing 0.8507 g CaCO$_3$, 0.2867 g CaCl$_2$.6H$_2$O (in excess of 30%), 0.0880 g Eu$_2$O$_3$ (99.99%) and the above produced Ag@SiO$_2$ microsphere powder, grinding uniformly in an agate mortar before putting into a corundum crucible, presintering at 500° C. for 2 h, and then sintering in the reducing atmosphere of 5:95 ($H_2/N_2$) at 1000° C. for 3 h to produce the $(Ca_{0.95}Eu_{0.05})_{10}Si_6O_{21}Cl_2:1\times10^{-3}$ Ag luminescent material.

Preparing the $(Ca_{0.95}Eu_{0.05})_{10}Si_6O_{21}Cl_2$ luminescent material by the same method.

FIG. 1 is a comparison diagram of the excitation spectra of the luminescent materials prepared in Example 7 (having a monitoring wavelength of 505 nm), where the curve a is the excitation spectrum of the luminescent material $(Ca_{0.95}Eu_{0.05})_{10}Si_6O_{21}Cl_2:1\times10^{-3}$Ag, and the curve b is the excitation spectrum of the luminescent material $(Ca_{0.95}Eu_{0.05})_{10}Si_6O_{21}Cl_2$. It can be seen from FIG. 1 that there is a broad excitation peak at around 370 nm and 410 nm, indicating that this luminescent material can be used in LED.

Figure 2:
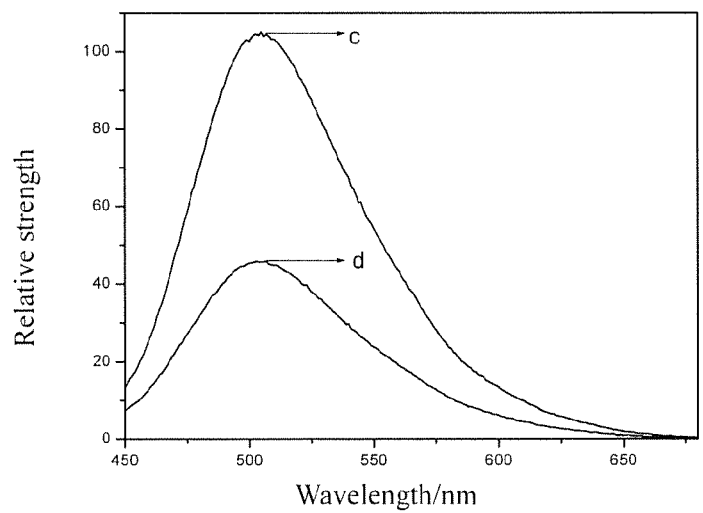
FIG. 2 is a comparison diagram of the emission spectra of the luminescent materials prepared in Example 7 (having an excitation wavelength of 370 nm), where the curve c is the emission spectrum of the luminescent material (Ca$_{0.95}$Eu$_{0.05}$)$_{10}$Si$_6$O$_{21}$Cl$_2$:1×10$^{-3}$Ag, and the curve d is the emission spectrum of the luminescent material (Ca$_{0.95}$Eu$_{0.05}$)$_{10}$Si$_6$O$_{21}$Cl$_2$.

FIG. 2 is a comparison diagram of the emission spectra of the luminescent materials prepared in Example 7 (having an excitation wavelength of 370 nm), where the curve c is the emission spectrum of the luminescent material $(Ca_{0.95}Eu_{0.05})_{10}Si_6O_{21}Cl_2:1\times10^{-3}$Ag, and the curve d is the emission spectrum of the luminescent material $(Ca_{0.95}Eu_{0.05})_{10}Si_6O_{21}Cl_2$. It can be seen from FIG. 2 that the luminous intensity can be improved by 1.3 times after metal doping.

The above halogen silicate luminescent material has excellent stability, high luminous efficiency, a color rendering index more than 85%, and good luminescent property, and can be applied to LED. Besides, with the core-shell structure of the halogen silicate luminescent material, the internal quantum efficiency of the luminescent material can be improved by making use of the surface plasmon resonance generated by the surface of metal nanoparticles, thus further enhancing the luminous intensity. The halogen silicate luminescent material produced by the above preparation method has good stability and high luminous intensity, and the preparation method has the advantages of simple operation, no pollution, easy control, low requirements for equipment, and being favorable to industrialized production, and can be widely applied to the field of preparation of the luminescent materials.

The above examples only show several embodiments of the present invention. Although they are described specifically and in detail, they cannot be comprehended as restriction of the scope of the present invention patent. For those of ordinary skill in the art, it should be indicated that some deformation and improvement could also be made without departing from the concept of the present invention, and all fall within the scope of protection of the present invention. Therefore, the scope of protection of the present invention patent shall be determined by the appended claims.

What is claimed is:

1. A halogen silicate luminescent material, having a chemical structural formula of $(N_{1-a-b}Eu_aMn_b)_{10}Si_6O_{21}Cl_2$ with xM nanoparticles, wherein M is at least one of Ag, Au, Pt and Pd; N is an alkaline earth metal selected from the group consisting of Mg, Ca, Sr and Ba; $0<x\leq1\times10^{-2}$; $0<a\leq0.3$ and $0\leq b\leq0.3$.

2. The halogen silicate luminescent material according to claim 1, represented by the formula $M@(N_{1-a-b}Eu_aMn_b)_{10}Si_6O_{21}Cl_2$ wherein M is an inner core and $(N_{1-a-b}Eu_aMn_b)_{10}Si_6O_{21}Cl_2$ is an outer shell.

3. A method of preparation of halogen silicate luminescent material, comprising:

first preparing M nanoparticle sol;

then preparing $M@SiO_2$ microsphere powder by coating M with $SiO_2$ according to the stöber method; and weighing a solution composed of alkaline earth metal chloride, manganese acetate and europium nitrate at a certain volume ratio to add to a beaker according to contents of alkaline earth metal, Eu and Mn in the final halogen silicate luminescent material, and stirring to produce a mixed solution A; adding a complexing agent and a gelling agent into the solution A, heating at 70° C.-90° C. in a water bath, and stirring sufficiently to produce a sol B; scattering the $M@SiO_2$ microsphere powder (a) ultrasonically into an ethanol solution to obtain a solution C; adding the solution C into the sol B, reacting at 70° C.-90° C. in a water bath to produce a gel, which is dried to produce a precursor of the halogen silicate luminescent material; presintering the precursor at 500° C.-800° C. for 2-7 h, cooling, grinding, calcining the ground product in a reducing atmosphere at 800° C. -1300° C. for 2-6 h, and grinding to produce the $M@(N_{1-a-b}Eu_aMn_b)_{10}Si_6O_{21}Cl_2$ luminescent material; and the complexing agent is citric acid, a molar ratio of which to the total metal ions in the mixed solution is from 1:1 to 3:1, and the gelling agent is polyethylene glycol, where M is at least one of Ag, Au, Pt and Pd, N is an alkaline earth metal selected from the group consisting of Mg, Ca, Sr and Ba, $0<x\leq x\times10^{-2}$, $0<a\leq0.3$, and $0\leq b\leq0.3$.

4. The method of preparation of the halogen silicate luminescent material according to claim 3, characterized in that the preparation of the M nanoparticle sol includes the following specific steps:

A1) preparing a metal M compound solution, and dissolving one or more assistants into the metal M compound solution under a magnetic stirring condition, making the assistant(s) have a concentration of $1.5\times10^{-4}$–$2.1\times10^{-3}$ g/mL in the final M nanoparticle sol; and A2) preparing a reductant solution, adding the reductant solution into the solution containing the assistant(s) obtained in the above A1) under the magnetic stirring condition in an amount ratio of the reductant to the metal ion from 1.2:1 to 4.8:1, and reacting for 10-45 min to obtain the M nanoparticle sol.

5. The method of preparation of the halogen silicate luminescent material according to claim 4, characterized in that the compound in the metal M compound solution is at least one of $AgNO_3$, $AuCl_3\cdot HCl\cdot 4H_2O$, $H_2PtCl_6\cdot 6H_2O$ and $PdCl_2\cdot 2H_2O$, and the solvent is water or ethanol; the assistant is at least one of polyvinylpyrrolidone, sodium citrate, cetyl trimethylammonium bromide, sodium lauryl sulfate and sodium dodecanesulphonate; in the reductant solution, the reductant is at least one of hydrazine hydrate, ascorbic acid and sodium borohydride, and the solvent is water or ethanol.

6. The method of preparation of the halogen silicate luminescent material according to claim 4, further comprises steps of surface treatment on the obtained M nanoparticle sol, which are specifically as follows: weighing a certain amount of surface treatment agent according to volume of the M nanoparticle sol, adding into the M nanoparticle sol, and stirring at room temperature for 3-24 h to make the surface treatment agent have a concentration of 0.001-0.1 g/mL in the final sol; and the surface treatment agent is polyvinylpyrrolidone.

7. The method of preparation of the halogen silicate luminescent material according to claim 6, characterized in that the preparation of the $M@SiO_2$ microsphere powder according to the stöber method includes the following specific steps:

adding 4.33 mol/L ethyl orthosilicate into a mixed solution composed of deionized water, the M nanoparticle sol having been subject to the surface treatment, ethanol and ammonia water to allow a condensation-polycondensation reaction to occur, stirring for 3-12 h to obtain a milky white M@SiO$_2$ colloid suspension, which is thermostatically dried at 80° C.-150° C. and ground to produce M@SiO$_2$ microsphere powder (a), which is alternatively further presintered at 300° C.-500° C. for 2-5 h to produce M@SiO$_2$ microsphere powder (b);

a volume ratio in the mixed solution of a volume sum of the deionized water and the M nanoparticle sol having been subject to the surface treatment to ethanol to ammonia water is 10:25:6; and the amount of ethyl orthosilicate is determined according to silicon content in the final halogen silicate luminescent material.

8. A method of preparation of halogen silicate luminescent material, comprising:

first preparing M nanoparticle sol;

then preparing M@SiO$_2$ microsphere powder by coating M with SiO$_2$ according to the stöber method; and characterized in that the preparation of halogen silicate luminescent material having a chemical structural formula of M@(N$_{1-a-b}$Eu$_a$Mn$_b$)$_{10}$Si$_6$O$_{21}$Cl$_2$ with the M@SiO$_2$ microsphere powder as the raw material by a high-temperature solid-phase method includes the following specific steps:

weighing the M@SiO$_2$ microsphere powder (b), NCO$_3$, NCl$_2$.6H$_2$O in excess of 10%-40%, Eu$_2$O$_3$ and MnCO$_3$ or Mn(OAc)$_2$ according to the contents of alkaline earth metal, Eu and Mn in the final halogen silicate luminescent material, grinding uniformly in an agate mortar, putting into a corundum crucible, first presintering at 500° C.-800° C. for 2-7 h, cooling, grinding, then sintering in the reducing atmosphere at 800° C. -1300° C. for 2-6 h, and grinding to produce the M@(N$_{1-a-b}$Eu$_a$Mn$_b$)$_{10}$Si$_6$O$_{21}$Cl$_2$ luminescent material; and the reducing atmosphere is one of a mixed gas composed of nitrogen and hydrogen in a volume ratio of 95:5 or 90:10, pure hydrogen, and carbon monoxide;

where M is at least one of Ag, Au, Pt and Pd, N is an alkaline earth metal selected from the group consisting of Mg, Ca, Sr and Ba, $0<x\leq1\times10^{-2}$, $0<a\leq0.3$, and $0\leq b\leq0.3$.

9. The method of preparation of the halogen silicate luminescent material according to claim 8, characterized in that the preparation of the M nanoparticle sol includes the following specific steps:

A1) preparing a metal M compound solution, and dissolving one or more assistants into the metal M compound solution under a magnetic stirring condition, making the assistant(s) have a concentration of $1.5\times10^{-4}$–$2.1\times10^{-3}$ g/mL in the final M nanoparticle sol; and A2) preparing a reductant solution, adding the reductant solution into the solution containing the assistant(s) obtained in the above A1) under the magnetic stirring condition in an amount ratio of the reductant to the metal ion from 1.2:1 to 4.8:1, and reacting for 10-45 min to obtain the M nanoparticle sol.

10. The method of preparation of the halogen silicate luminescent material according to claim 9, characterized in that the compound in the metal M compound solution is at least one of AgNO$_3$, AuCl$_3$.HCl.4H$_2$O, H$_2$PtCl$_6$.6H$_2$O and PdCl$_2$.2H$_2$O, and the solvent is water or ethanol; the assistant is at least one of polyvinylpyrrolidone, sodium citrate, cetyl trimethylammonium bromide, sodium lauryl sulfate and sodium dodecanesulphonate; in the reductant solution, the reductant is at least one of hydrazine hydrate, ascorbic acid and sodium borohydride, and the solvent is water or ethanol.

11. The method of preparation of the halogen silicate luminescent material according to claim 9, further comprises steps of surface treatment on the obtained M nanoparticle sol, which are specifically as follows: weighing a certain amount of surface treatment agent according to volume of the M nanoparticle sol, adding into the M nanoparticle sol, and stirring at room temperature for 3-24 h to make the surface treatment agent have a concentration of 0.001-0.1 g/mL in the final sol; and the surface treatment agent is polyvinylpyrrolidone.

12. The method of preparation of the halogen silicate luminescent material according to claim 11, characterized in that the preparation of the M@SiO$_2$ microsphere powder according to the stöber method includes the following specific steps:

adding 4.33 mol/L ethyl orthosilicate into a mixed solution composed of deionized water, the M nanoparticle sol having been subject to the surface treatment, ethanol and ammonia water to allow a condensation-polycondensation reaction to occur, stirring for 3-12 h to obtain a milky white M@SiO$_2$ colloid suspension, which is thermostatically dried at 80° C. -150° C. and ground to produce M@SiO$_2$ microsphere powder (a), which is alternatively further presintered at 300° C. -500° C. for 2-5 h to produce M@SiO$_2$ microsphere powder (b);

a volume ratio in the mixed solution of a volume sum of the deionized water and the M nanoparticle sol having been subject to the surface treatment to ethanol to ammonia water is 10:25:6; and the amount of ethyl orthosilicate is determined according to silicon content in the final halogen silicate luminescent material.

* * * * *